United States Patent [19]

Abdenour

[11] Patent Number: 5,036,755
[45] Date of Patent: Aug. 6, 1991

[54] BREWING IMPROVEMENT

[76] Inventor: Joseph D. Abdenour, 496 St. Clair, Grosse Pointe, Mich. 48230

[21] Appl. No.: 559,507

[22] Filed: Jul. 24, 1990

Related U.S. Application Data

[63] Continuation of Ser. No. 423,507, Oct. 13, 1989, abandoned, which is a continuation of Ser. No. 807,156, Dec. 10, 1985, abandoned, which is a continuation of Ser. No. 270,905, Jun. 5, 1981, abandoned, which is a continuation-in-part of Ser. No. 153,317, May 27, 1980, Pat. No. 4,487,114.

[51] Int. Cl.$^5$ .............................................. A47J 31/06
[52] U.S. Cl. ........................................ 99/306; 99/295
[58] Field of Search ................ 99/179, 306, 295, 316, 99/317, 323, 308, 307, 309, 310, 311, 312, 313, 314, 315; 426/433; 210/474, 479, 482

[56] References Cited

U.S. PATENT DOCUMENTS

| | | | |
|---|---|---|---|
| 2,011,102 | 8/1935 | Fisher | 99/310 |
| 2,716,937 | 9/1955 | Milano | 99/306 |
| 2,743,664 | 5/1956 | Dale | 99/306 |
| 2,885,290 | 5/1959 | Krasker | 99/306 |
| 3,139,344 | 6/1964 | Weisman | 99/306 |
| 3,695,167 | 10/1972 | Schmidt | 99/306 |
| 3,823,656 | 7/1974 | Vander | 99/295 |
| 4,167,136 | 9/1979 | Chupurdy | 99/322 |

*Primary Examiner*—Robert W. Jenkins
*Attorney, Agent, or Firm*—Joseph W. Farley

[57] ABSTRACT

Coffee brewing apparatus includes a brew holder having an interior cup portion extending downwardly from a rim, and a plastic, liquid impervious liner supportable by the rim and extending within the cup portion, the liner having an upper overlay portion adapted to cover the rim and extend exteriorly of the holder. A brew basket has a lip engageable with the holder rim and liner, is isolated from the holder by the liner, and is held in engagement with the holder rim and liner by an arm movably carried by the holder, the arm having a distributor portion adapted to engage the top of the brew basket.

28 Claims, 9 Drawing Sheets

BREWING IMPROVEMENT

This is a continuation of application Ser. No. 07/423,507 filed Oct. 13, 1989, now abandoned which is a contiunation of application Ser. No. 06/807,156 filed Dec. 10, 1985, now abandoned, which is a continuation of application Ser. No. 06/270,905 filed June 5, 1981, now abandoned, which is a continuation-in-part of application Ser. No. 153,317 filed May 27, 1980, now U.S. Pat. No. 4,487,114.

This invention relates generally to brewing. More particularly, this invention relates to the control of purity and qualitative and quantitative parameters of brewing coffee and like beverages.

Prior to this invention, it has been a common practice in the art of brewing coffee to use a plurality of structures for maintaining controlled flow of liquid through commiunted particles in the process of forming a beverage solution. A variety of pots and apertured devices have been used. Portions of these structures have been disposable, while other portions require washing in order to maintain the quality and purity of the brew.

One of the problems of these past efforts has been the necessity to provide the labor to perform the washing process subsequent to the brewing process. Another problem has been the time delay required for the washing between successive operations of brewing. Where attempts have been made to economize on the labor involved, not washing between every brewing operation, the quality and purity of the brewed product has suffered.

Accordingly, it is an object of this invention to provide means for brewing wherein all of the structure containing liquid that is partially or entirely solute for the ultimate brewed product can be utilized with the complete elimination of any washing operation.

It is another object of this invention to provide structure for brewing wherein such structure is inexpensive and uncomplicated to make and use.

It is a still further object of this invention to provide an improved brewing process completely free of contaminants that may have been deposited on structures in prior brewing batches wherein the brewing process comprises a plurality of successive batches.

It is a still further object of this invention to provide an improved brewing process wherein the components of that process are inexpensive to manufacture and use.

It is a still further object of this invention to provide an improved brewing process wherein the brew basket, in combination with an unlipped coffee pot, can provide means for the pouring of liquid from the pot without structural modification of the pot itself.

It is a still further object of this invention to provide an improved brewing process wherein the components of that process allow for prepackaged coffee to be brewed therein as well as loose coffee to be brewed therein, and having means for venting the components thereof of gases during high temperature application, and to be sufficiently inexpensive to make, use and sell, to allow disposability and the use of fresh apparatus for subsequent brew.

It is a still further object of this invention to provide an improved brewing process wherein components of that process include a brew basket that has rasied and lowered areas proximate apertures for the allowing of brew to pass therethrough that is capable of inexpensive and precise manufacture using dies.

These and other objects of this invention are achieved by the provision of a brew basket member; a cap member; and a cup member. The brew basket cooperates with the cup member in such a manner as to provide upper extending flow conduit configuration means to allow the pouring of brew from the cup. Also provided in the brew basket member is a vent to allow gases to replace the volume displaced by the flow of liquid from the cup. The cap member has apertures to allow the flow of water therethrough into the brew basket and also has vent portions to allow the venting of gas from the brew basket that is displaced by the unfusion of water flow thereinto. The brew basket member has raised and lowered portions on the bottom thereof proximate relatively large apertures for the passing of brew product therethrough. A filter paper inserted in the brew basket and covering the aforementioned raised and lowered areas in the bottom thereof allows the filtering of the brew therethrough into the cup member below. Alternatively, coffee may be packaged in filter paper and placed on the raised sections of the bottom of the brew basket to allow the filtering of the solute therethrough.

These and other objects of this invention can be appreciated from the foregoing specifications and claims.

ON THE DRAWINGS

Before explaining the present invention in detail, it is to be understood that the invention is not limited in its application to the details in construction and arrangement of arts illustrated in the accompanying drawings, since the invention is capable of other embodiments and of being practiced or carried out in various ways.

Also, it is to be understood that the phraseology and terminology employed herein are for the purpose of description and not of limitation.

AS SHOWN ON THE DRAWINGS

Figure 1:
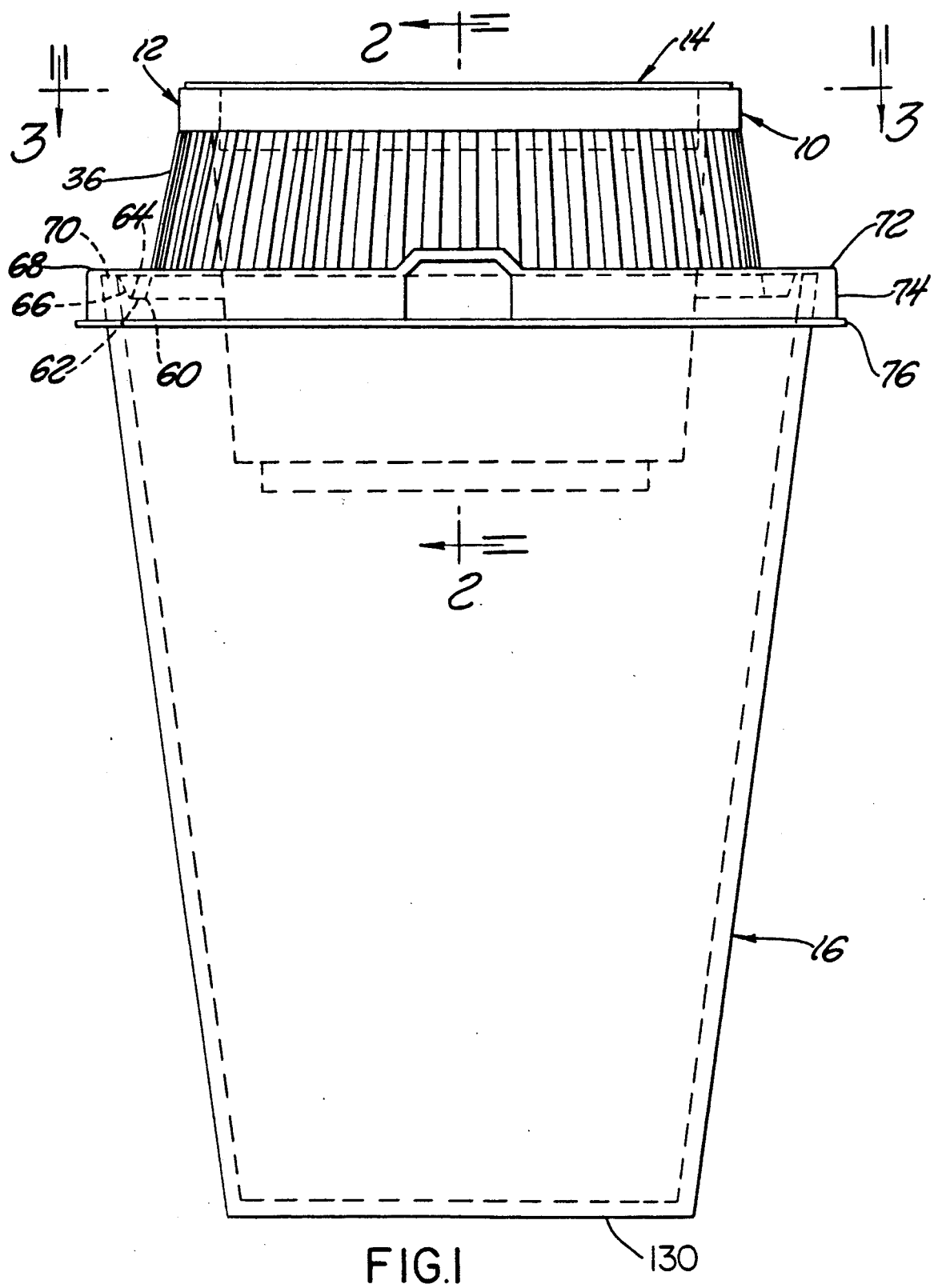
FIG. 1 is a front view of the preferred embodiment of this invention.

FIG. 1 shows an embodiment of the invention shown generally at numeral 10. The apparatus 10 comprises a brew basket member 12, a cap member 14, and a cup member 16. The brew basket member 12 has a body 18 that is essentially in the shape of a right circular frustoconical section. The body 18 has sloping sides 20 that have ribs 22 forming ridges and valleys on the sides thereof. The main body side wall 20 has an interior side 24 and an exterior side 26. A horizontal wall portion 32 extends continuously, horizontally and directly from the vertical wall section 20. At a corner 34, a downwardly extending wall portion 36 exterior to wall surface 26 continues vertically downward continuously from and immediately connecting with wall portion 32.

A draft angle is formed between the wall 20 and a vertical plumb line 40. A similar draft angle is formed on the outer wall 36 with a vertical plumb line. These draft angles foster ease of mold design, manufacture, and subsequent nesting of the product.

At junction 44, horizontal extending wall section 46 extends radially horizontally away from wall portion 36 forming a spout for conduit of liquids through chamber 48 and having a radially curved downward section 50. At junction 52, a horizontal wall section 54 extends radially away from wall section 36 to form a lip containing a chamber 56 for the allowance of air or gas to pass therethrough continuing through connecting conduit portion 58 exteriorly of the cup 16. Other than the spout sections 50 and 54, circularly around the rest of the bottom rimmed portion of the brew basket 12, the wall portion 36 meets at junction 60 with a horizontally extending wall portion 62 and, at junction 64, an upwardly extending wall section 66 forms a right circular frustoconical section continuous from, extending from, and contiguous to horizontal section 62. At junction 68, a horizontal wall section 70 extends radially outardly continuous with and contiguous to wall section 66. At junction 72, wall section 74, in the shape of a right circular cylindrical section, extends continuously, contiguous to wall section 70. A lip or rim 76, contiguous to wall section 74 and extending radially outward therefrom, provides the lower terminal wall structure of brew basket 12.

Wall section 20 at junction 80 connects continuous with bottom section 82 of the brew basket 12. Bottom section 82 has a peripheral raised portion 84 contiguous with lowered portions 86 and connected by intermediate vertical wall sections 88. Similar lowered portions 90 and raised portions 92 are arranged in a symetrical pattern interiorly inward from the outer perimeter 94 of the bottom section 82. A central raised conical portion 96 is provided for the centering of filter paper, prepackaged coffee, and the like. Portion 96 may, alternatively, be replaced by an aperture at the same location with the same horizontal dimensions. A plurality of apertures 98 are provided in bottom section 82 for the passage of brew therethrough to the coffee pot or cup member 16 below.

The cap member 14 is in the shape of a hollow dish. A bottom section 100 is in the shape of a right circular cylindrical disc. Cap 14 has upwardly extending right circular frustoconical section walls 102 contiguous with, continuous from, and extending above vertically radially outwardly from bottom portion 100. The walls 102 have ribs 104 forming ridges and valleys in the upward extending vertical wall portion 102. A termination lip 106 is provided around the outer perimeter 108 of the cap member 14.

Radially inward jogs 112, 114, 116 form notchlike areas in the outer periphery 108 of the cap member 14. The wall 102 and lip 106 follow this periphery so that space is provided between the interior side 119 of section 30 of the brew basket 12 and the radially inward exteriorly facing portion of the notches 112, 114, 116. This allows the passage of gas from the interior of the brew basket when the cap 14 is placed thereon while water is passing through apertures 118 in the bottom portion 100 of the cap member 14.

Figure 2:
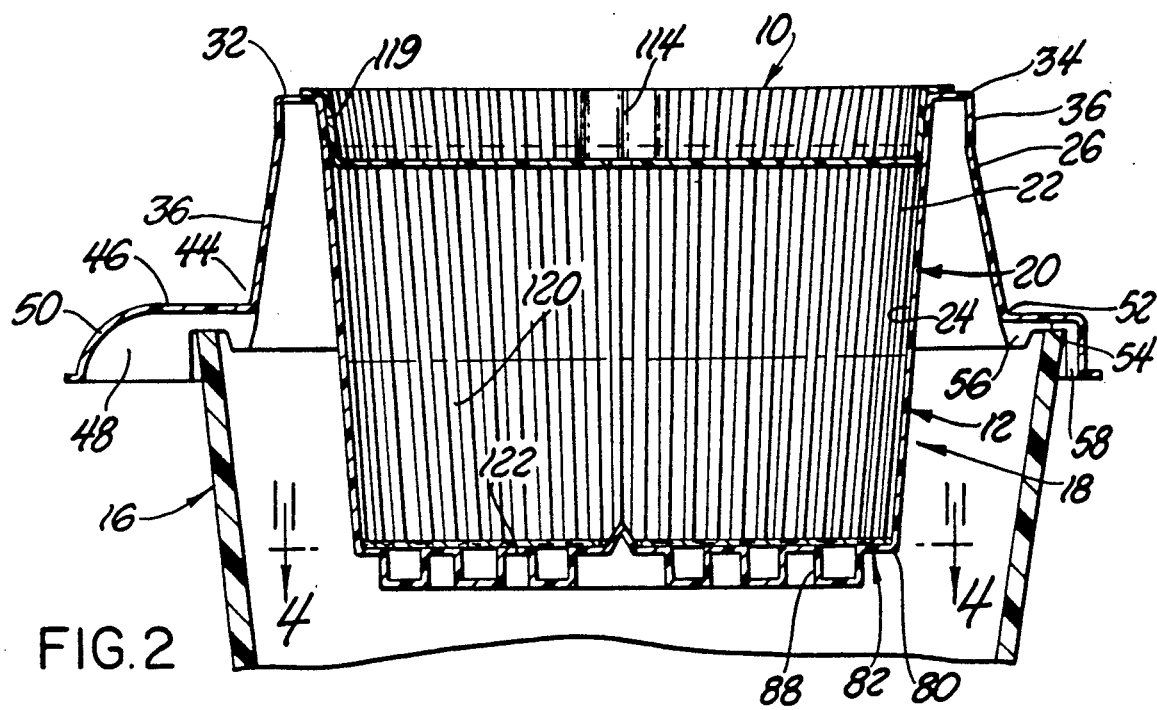
FIG. 2 is a partial cross-sectional view of the apparatus shown in FIG. 1 taken along the section lines 2—2 thereof.
Figure 3:
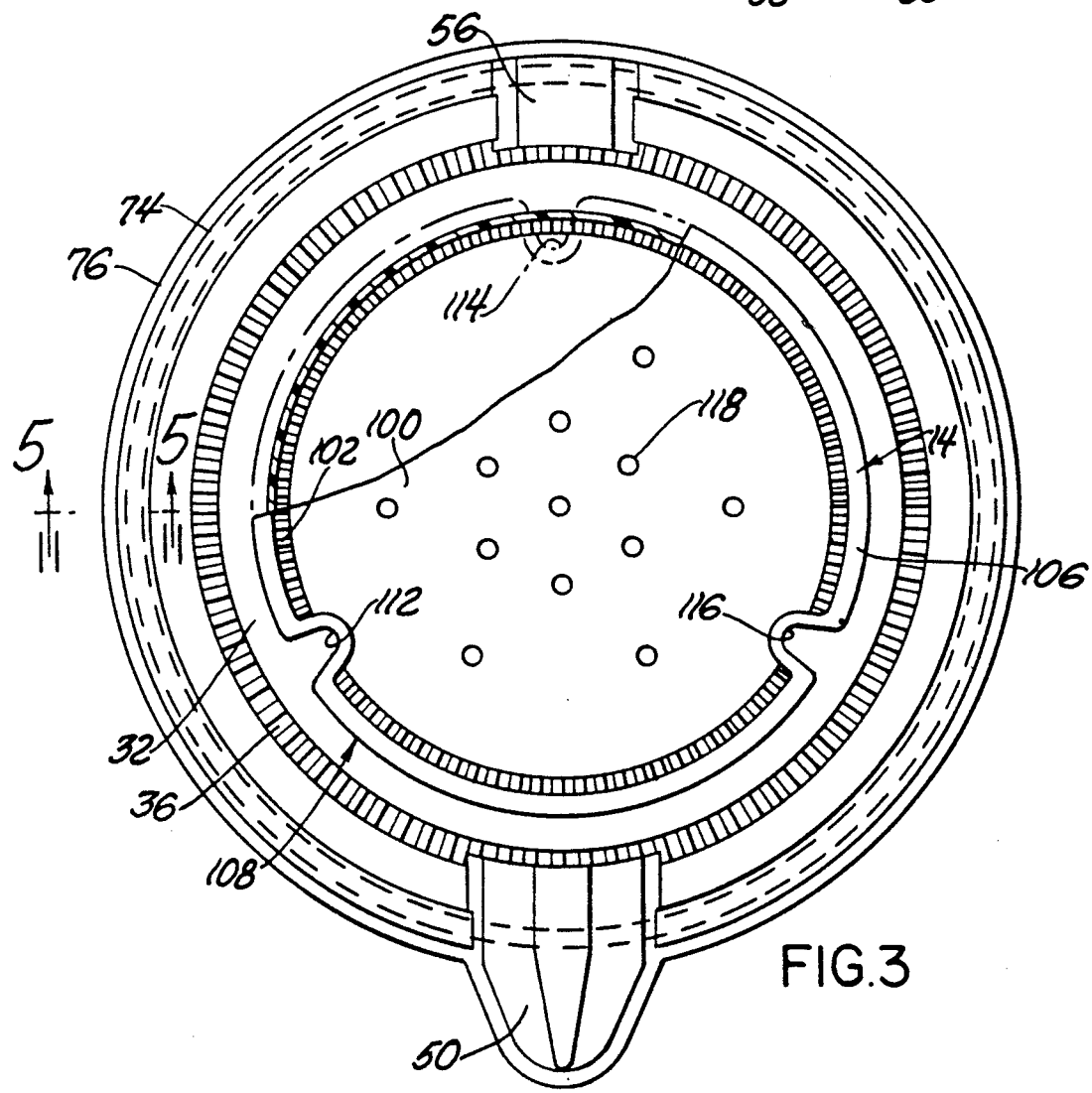
FIG. 3 is a top view of the apparatus shown in FIG. 1, partially broken away, taken along the section lines 3—3 thereof.
Figure 4:
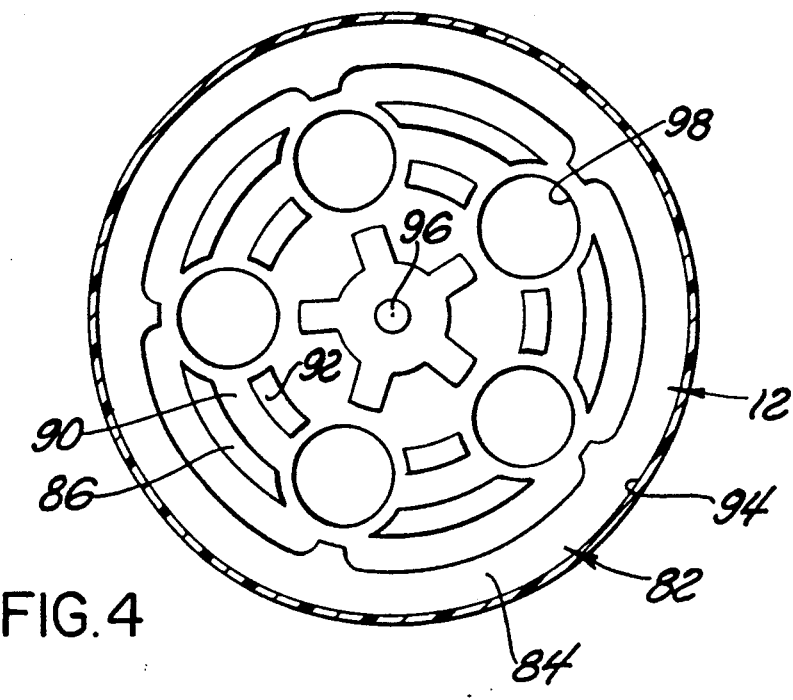
FIG. 4 is a transverse sectional view of the apparatus shown in FIG. 2 taken along the secton lines 4—4 thereof.

It can be readily seen that the cap member 14 can be pressed into a press fit engagement with wall surfaces 119 of the brew basket 14, and also be readily removed therefrom. When the cap is placed into the aforementioned egagement with the brew basket 14, an enclosed entity is provided wherein water may pass through the apertures 118 of the cap into the brew basket and the coffee indicated at numeral 120 contained within the brew basket, as shown in FIG. 2 may dissolve into the water. The filter paper 122 resting on bottom surfaces 82 of the brew basket provide a filtering of the solute through apertures 98 into the cup 16 below. The coffee pot or cup member 16 is in the shape of a right circular frustoconical section which is open at the top and has an enclosed bottom 130.

From the foregoing description of the structure this embodiment of this invention, it can be appreciated that the coffee once brewed and collected in the cup member 16 may be poured through conduit 48 and allow the passage of gases through conduits 56, 58 during such pouring. Further, the conduits 48, 56, 58 provide for the egress of gases while the brew is filling the cup 16. This obviates the necessity for any other apertures other than the apertures 48, 56, 58 in the brew basket to allow the venting of gases during the fill of the brew into the cup from the brew basket 12.

Figure 5:
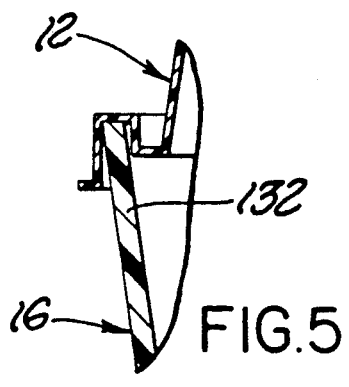
FIG. 5 is a partial detailed sectional view showing the cooperation of the lip of the brew basket with the cup member.

FIG. 5 is a cross-sectional detail showing the preferred embodiment of the radially outward downward exterior portions of the brew basket 12 in cooperation with the upward extending wall portion 132 of the cup member 16.

Figure 6:
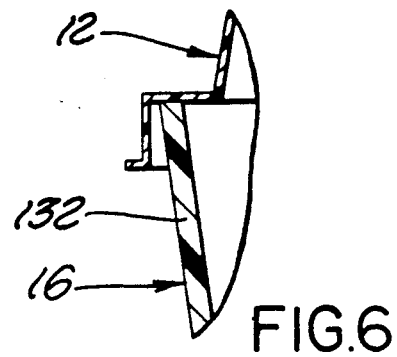
FIG. 6 is a partial sectional view of an alternative embodiment of the cooperation of a lip portion of the brew basket with the cup member.

FIG. 6 is an alternative embodiment showing a simpler construction but not having the lock features as shown in FIG. 5.

Figure 7:
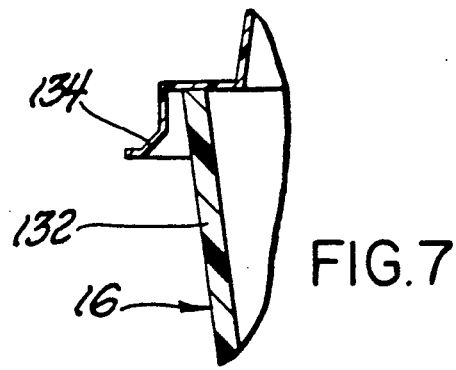
FIG. 7 is a further alternative partial sectional view showing the cooperation of the lip portion of the brew basket with the cup member.
Figure 8:
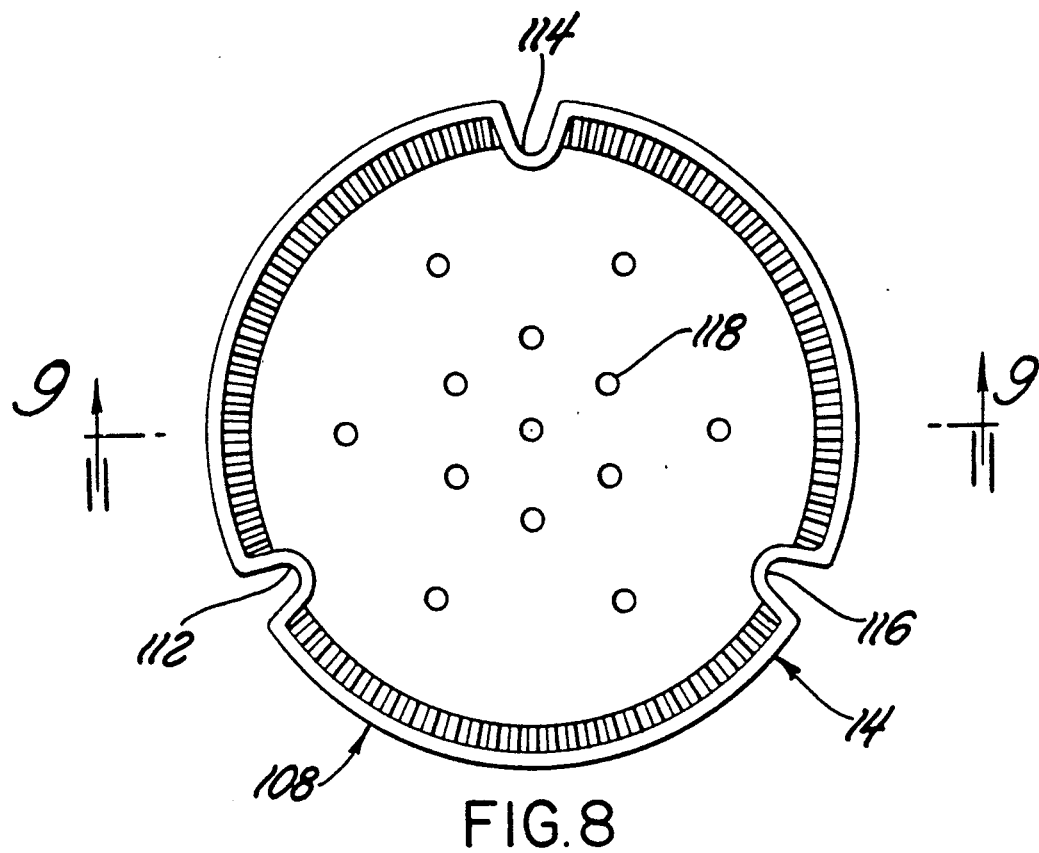
FIG. 8 is a top view of the cap member utilized in the embodiment shown in FIG. 1.
Figure 9:
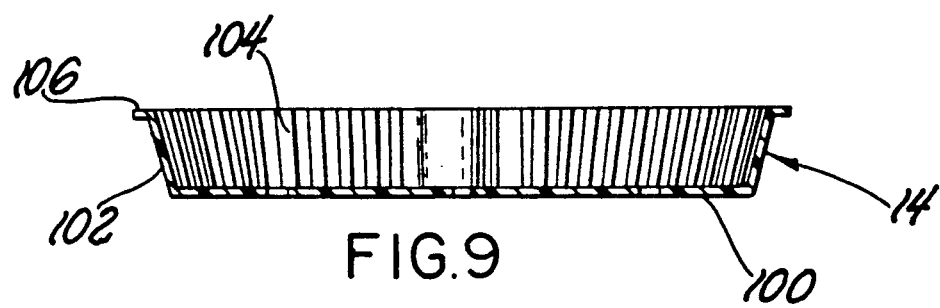
FIG. 9 is a transverse sectinonal view of the apparatus shown in FIG. 8.

FIG. 7 is a further alternative embodiment of the relationship between the downward radially outward portions of the brew basket 14 in mating relationship with the upward extending wall 132 of cup 16. In this alternative embodiment, an inclined plane portion 134 in the outer periphery of the brew basket allows for ease in the engagement of various diameters of cup members 16.

As can be appreciated from the foregoing specific descriptions of the draft angled components 12, 14 and 16, it can be appreciated that each of the three components, and a plurality of each of the components, can be nested, thus saving considerable space in shipping, storage, and handling. For example, because of the sloping sides of the frustoconical sides of the cup 16, a plurality of such cups can be nested together in a relatively small space. For another example, the sloping sides 102 of the cap 14 allow them to be stacked in a similar nesting relationship.

Similarly, the sloping interior surfaces 24 of the brew basket 12 allow similar nesting and stacking.

It can be further appreciated that when the composite portions 12, 14 and 16 of the brewing apparatus are assembled as shown in FIG. 1, an enclosed combined structure is provided that retains heat both within the brew basket and within the cup while allowing venting of gases through passages 48, 56, 58, and through the notches 112, 114, 116 of the cap.

In the preferred embodiment of this invention, the brew basket and cap are both made by vacuum form molding of plastic sheet material. Preferably, the thickness of the brew basket does not exceed 20 mils, and the preferable thickness is in the range of 6 to 16 mils. This is a substantial factor in reducing the cost, weight, and disposability after single use. At the same time, the ribs as shown in the drawings and described above, provide a substantial reinforcing element so that despite the relatively thin thickness of the walls, the walls are strong enough to withstand the stresses placed by holding the weight of coffee as well as stresses induced by heat and fluid pressures. Similarly, apertures or conduits provided in both the bottom and the top of the combined structure of the cap and brew basket allow sufficient venting of the gases while retaining sufficient heat for brewing so that a reduced thickness wall can be utilized.

Similarly, the hills and valleys as shown in FIG. 2 in cross-section provided further additional strength for the bottom portion of the brew basket so that reduced thickness of plastic can be used throughout in that area.

Another function of providing upper and lower portions, that is, portions that are raised from relatively lower portions or portions that are depressed from relatively upper portions in the bottom portion of the brew basket, allow free flow of liquid through the filter paper and prevent clogging by undissolved coffee sediment or grounds that would otherwise inhibit the flow of the brew to the cup below. This is a substantial factor in controlling the speed of the brew as well as the completeness of the brew and recovery of the brew in the cup below.

Another factor in the reduced thickness of the plastic walls and bottom of the structure of the brew basket can be appreciated by the provision of a centering raised portion to center the filter paper. This prevents the shifting of the filter paper and thus laying bare an unfiltered area in which brew can pass without filtering.

In the prior art devices, it has been necessary to provide notches or lips in the cup in order to facilitate flow. Prior art also requires apertures in the brew basket above and beyond those provided by the cap in order to allow proper venting.

In the preferred embodiment of this invention as described in detail above, this additional venting is not required because sufficient venting is provided by the chambers 48, 54, 58 in the brew basket itself to allow the passage of liquid therethrough over and above the top of the wall of the cup 16 and also allows the venting of gases to this part of cup 16.

In the preferred method of brewing coffee pursuant to this invention, a brew basket is provided of thin plastic dimensions as shown in the drawings, water is allowed to pass through the apertures in the cap to the interior chamber of the brew basket, where the coffee solute is in loose form over a filter paper or is in prepackaged form in filter paper. The brew basket itself allows brewing to take place within a closed environment, however allowing venting through the lip or notches in the cap. During the brewing process, the coffee is allowed to drip through the filter paper, and through the apertures in the bottom of the brew basket to the cup below. After the brewing process, the entire brew basket and cap may be disposed of as a single entity. This includes the grounds that are contained therein. This avoids manual handling of grounds for removal therefrom for subsequent washing, since subsequent washing is not necessary for a subsequent brew. Indeed, a fresh brew basket and cap may be utilized that has been uncontaminated by contact with coffee solution prior to making a fresh brew.

It can be appreciated from the foregoing description of the preferred embodiments of this invention that structure has been provided for brewing wherein the entire structure can be economically disposed of and thereby dispense with any washing step. It can be appreciated that successive batches of brews can be made without using the very same embodiments of structure, indeed entirely new embodiments of similar structure may be used. This is an important step in preserving the sanitation, flavor, purity and quality control, quantitatively and qualitatively, of successive brews with great precision.

An alternative embodiment of this invention 200 (FIGS. 11–14) comprises a holder 202, having a handle portion 204; a brew basket portion 206, a linear portion 208, a securing portion 210, a distributing portion 212 and a closure portion 214.

Preferably, the holder portion 202 has an outer wall 216 and an inner wall 218, each forming a right circular cylindrical entity, about a common central axis 220. Each of the portions 216, 218 form right circular cylindrical entities, having bottom portions 222 and 224 respectively.

In an alternative embodiment of this invention, the holder 202 has portions 216, 218 made of a polycarbonate or polypropylene or acrylonitrile butidiene styrene plastic material, having significant temperature-resistant and tensile strength properties. Preferably, the portions 216, 218 form outer and outer cups respectively, with the outside one having significantly higher temperature-resisting characteristics than the inner one. Alternatively, the portions 216, 218 could be made of an integral piece having substantially identical thermal and tensile strength properties throughout. In the preferred embodiment of this invention, the space 226 between the outer and outer cups 216 and 218, is simply filled with air. Alternatively, the space 226 could be evacuated to provide a thermal barrier, or filled with polypropylene foam.

An alternative form of the holder 202 comprises a bottom portion 222, made of a relatively higher thermal resistant material than the rest of the outer cup 216, and is preferably made of low thermal conductive material that at the same time has a high thermal resistance to melting or other destructive effects with the application of relatively high temperatures.

In this context, relatively high temperatures are considered in the range of 600 degrees Farenheit.

The top exterior surface 230 of the holder 202 is a right circular cylinder in shape. Jutting radially outward therefrom are a plurality of projections 234. Each of the projections 234 comprises a right circular cylindrical section 236, and a radially outward portion 238, having a greater diametric extremity than the diametric extremity of portion 236.

The liner 208 is formed of a liquid impervious bag-like container having perforations near the top 240 portion thereof; so as to tear off in a strip-like manner. The liner 208 has a lower portion 242, a lip portion 244 and a body cavity portion 246. A cutout portion 248 is also provided.

Preferably, the holder 202 has vent portions 250 aligned proximate the center of the handle portion 204. These vent portions 250 are preferably vertical indentations in the top portion 230 of the outer cup portion 216 of the holder 202. These apertures 250 provides a venting of gasses from the area of the interior holder 202, proximate the interior wall 252 of the interior cup portion 218, to the outside, or exteriorly of the apparatus 202 taken as a whole.

The cutout portion 248 is designed to be placed proximate the array of aperatures 250 in order to facilitate, in an uncomplicated manner, the placing of the linear 208 within the holder 202 and also to prevent blocking of those apertures by placement of the liner 208 in a manner to be discussed hereinafter.

In an alternative embodiment of this invention, the apparatus 200 comprises the placement of the liner 208 in such a manner that apertures 254 in the lip portion 246 of the liner 208 are placed in juxtaposition to projections 234 on the top cylindrical portion 230 of the holder 202. This is achieved by folding the lip portion 246 radially outward from the interior of the holder 202, with respect to central axis 220, in such a manner that the apertures 254 engage the projections 234. More specifically, the apertures 234 are passed over the exteriorly outer greater diameter portion 238 to engage the cylindrical surface of the radially inward portion 236 of the projections 234. When this is done, the diametrically wider portion 238 inhibits or limits the movement of the liner 208 away from engagement with the shank portion 236.

The lip portion 244 engages the top rim 256 of the holder 202, and the lower portion 202 descends therefrom radially inwardly therefrom within the holder 202 in such a manner that the exterior surface of the liner comes into contact with the interior surface 252 of the inner cup 218, or at least a substantial portion of the liner comes into such contact. As discussed hereinafter, after the liner 208 is in place within the holder 202, the addition of liquid being poured into the liner 208 forces greater contact between the liner 208 and the aforementioned surface 252, as well as intimate contact of the liner 208 with the bottom surface 224 of the inner cup 218 of the holder 202.

In an alternative embodiment of this invention, the handle portion 204 compromises a handle member 260, radially exterior of outer cup 216 and integrally attached thereto. The top portion of handle portion 204, referred to generally at 262, has an inner right circular cylindrical surface 264 in telescoping engagement with a tube shank portion 266. The tube shank portion 266 has a projection 268 that engages in a male-female manner with a female detent portion 270 of the portion 262.

The tube shank portion 266 can be selectively manually depressed within cylinder portion 264 for compressive engagement with the liner 208, in a manner to be discussed hereinafter.

When tube shank member 266 is into detent engagement with female portion 270, the extending arm portion 280, carrying distributor member 212, engages the top of the brew basket 206. The basket 206 transmits pressure exerted onto it by arm portion 280 to lip portion 244. The top surface of lip portion 244 of liner 208 presses that lip portion 244 into engagement with the top lip surface portion 256 of the holder 202.

In an alternative embodiment of this invention, the arm portion 280 may have a relatively flat lower planar surface that forms an acute dihedral angle with the central axis of the cylindrical tube member 266. By this means, positive action of yieldably engaging the lip portion 244 of the liner 208 is achieved when tube member 266 has its projection portion 268 in engagement with the detent 270.

In an alternative embodiment of this invention, the bottom portion of the holder 202 has downwardly projecting feet 223 to provide an air gap for air insulation between a hot plate, if it is desired to rest holder 202 thereon, and the bulk of the holder 202. This has the effect of reducing thermal conductivity in a selective manner, and allows air cooling of the bottom of the holder 202 if the hot plate is in a highly heat conductive state.

In an alternative embodiment of this invention, the projections 234 are selectively arranged in a predetermined pattern to conform to a predetemined selected array to conform to a coding by physical means of the liner with a particular holder configuration for precise and unmistakable identification of the proper liner with the proper holder.

Figure 10:
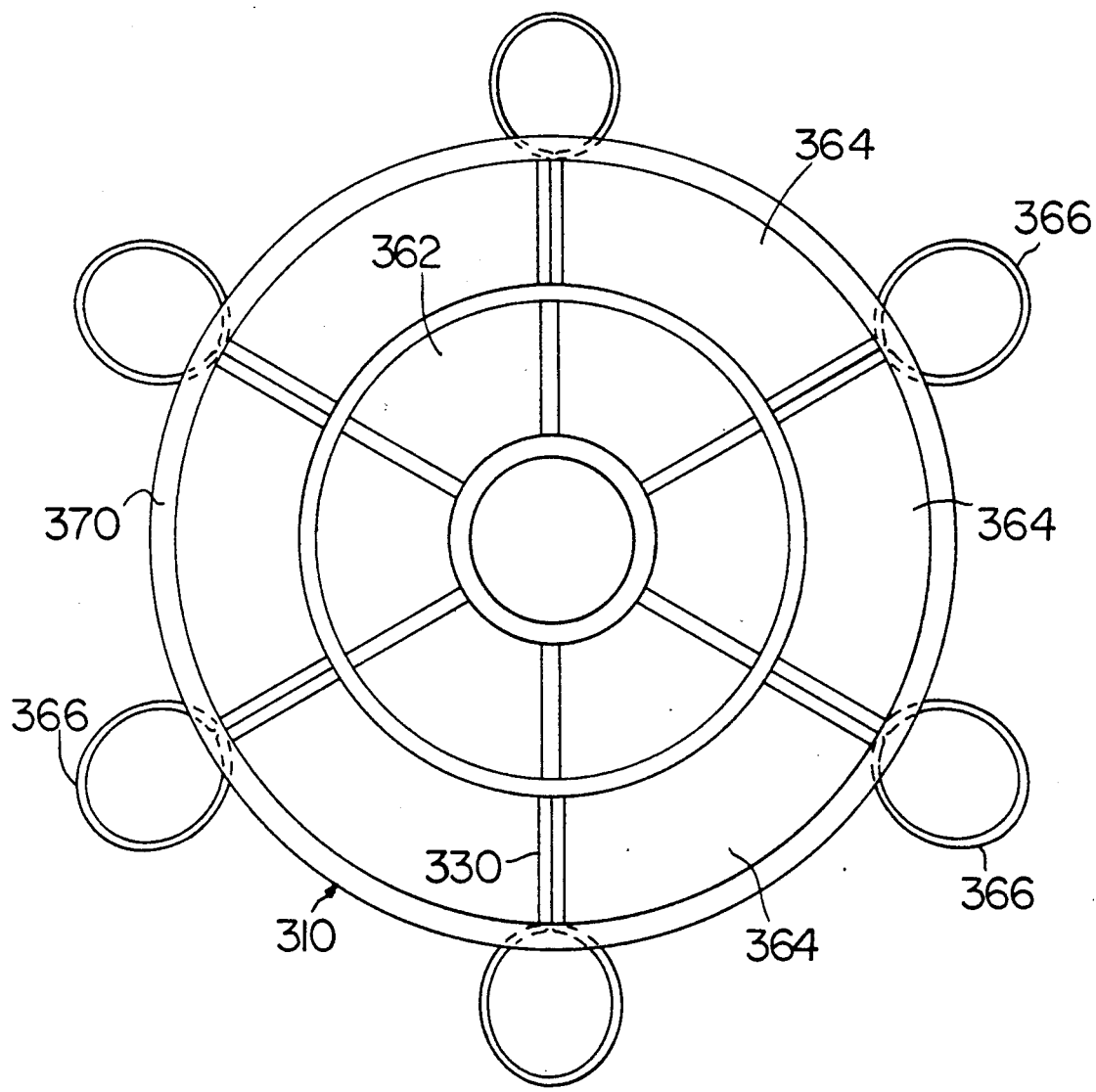
FIG. 10 is a top view of an alternative embodiment of this invention.
Figure 11:
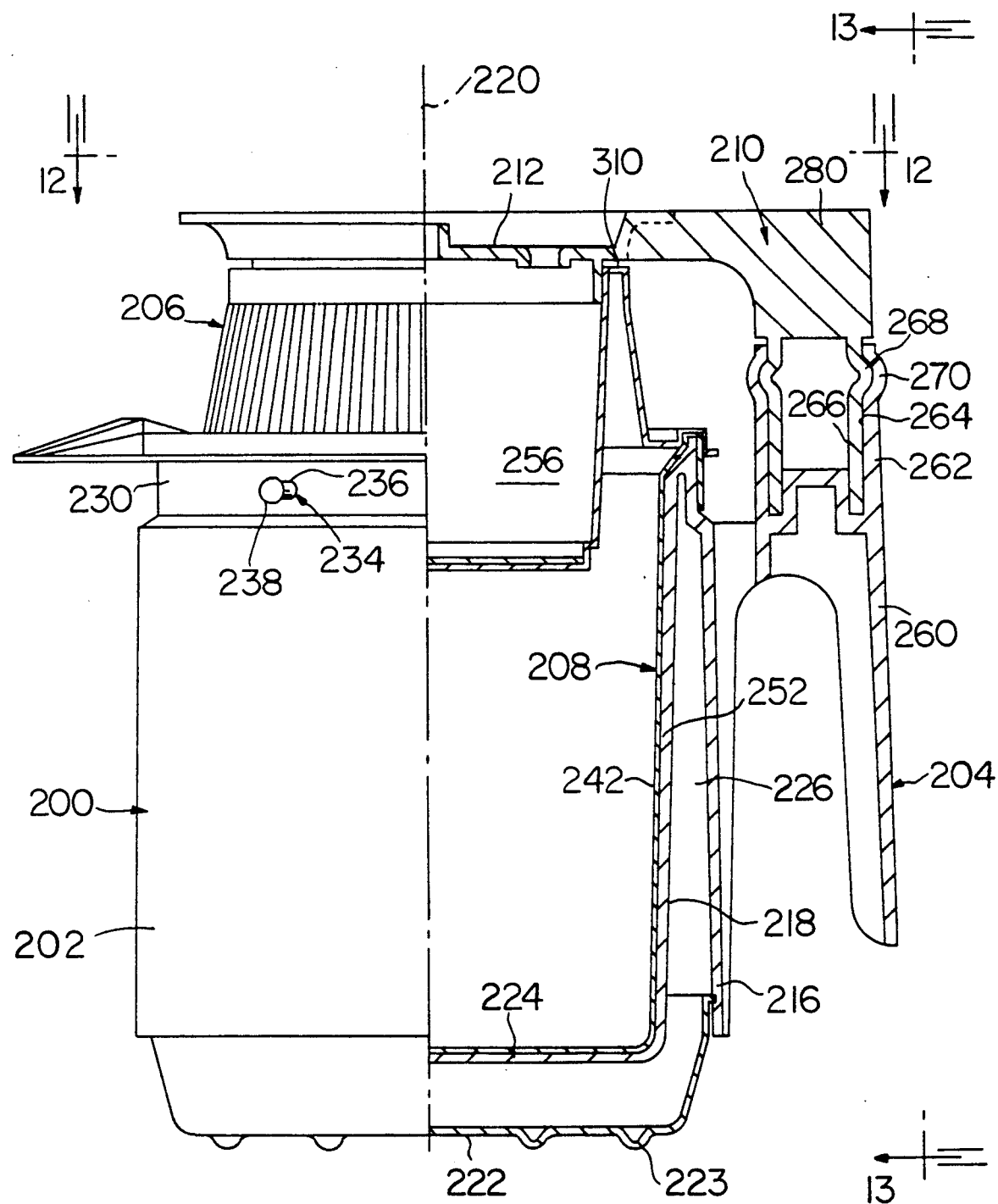
FIG. 11 is a side view of an alternative embodiment of this invention.
Figure 12:
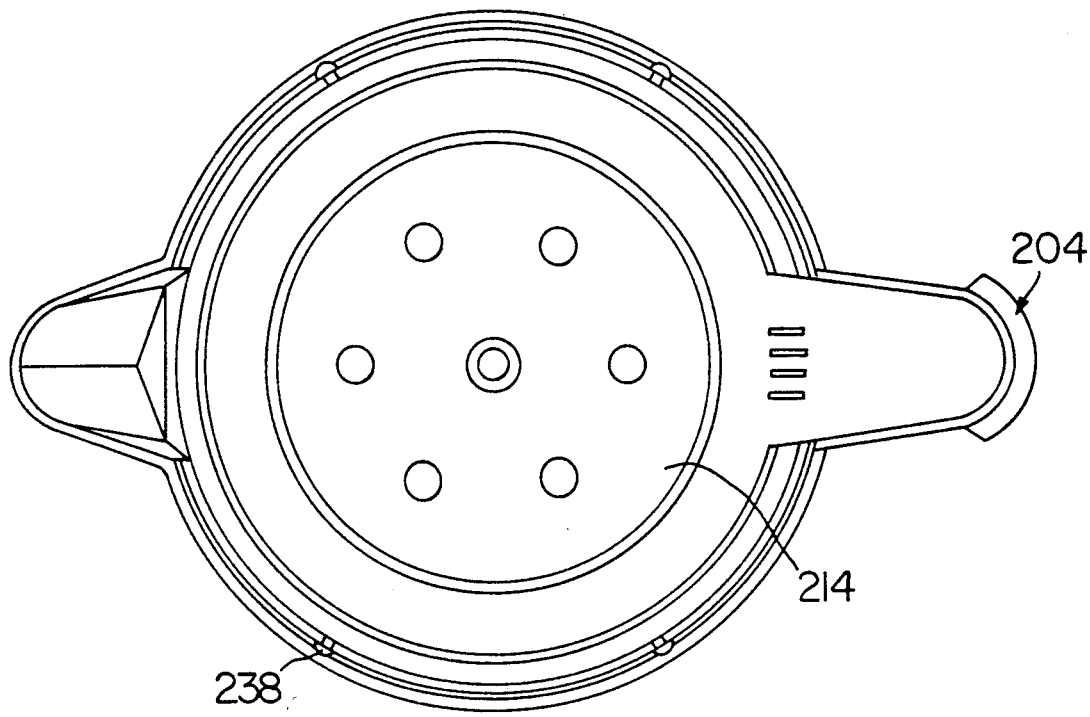
FIG. 12 is a top view of the apparatus shown in FIG. 11.
Figure 15:
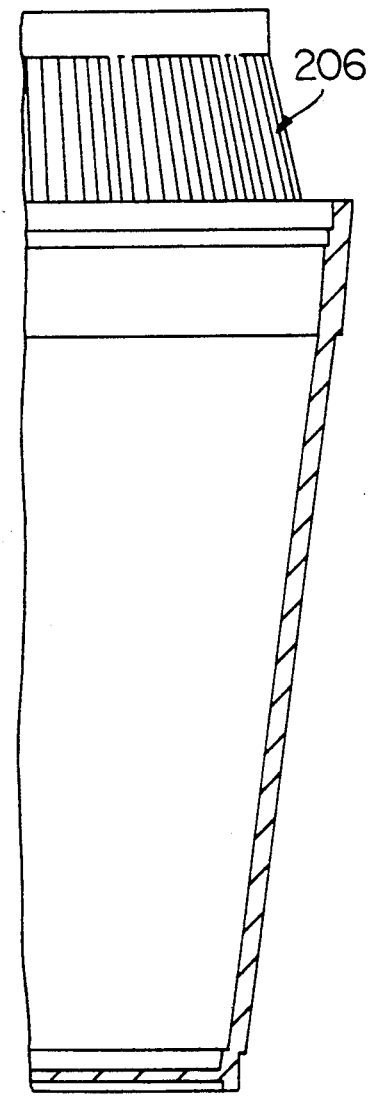
FIG. 15 is a partial cross sectional view of an alternative embodiment of this invention.
Figure 13:
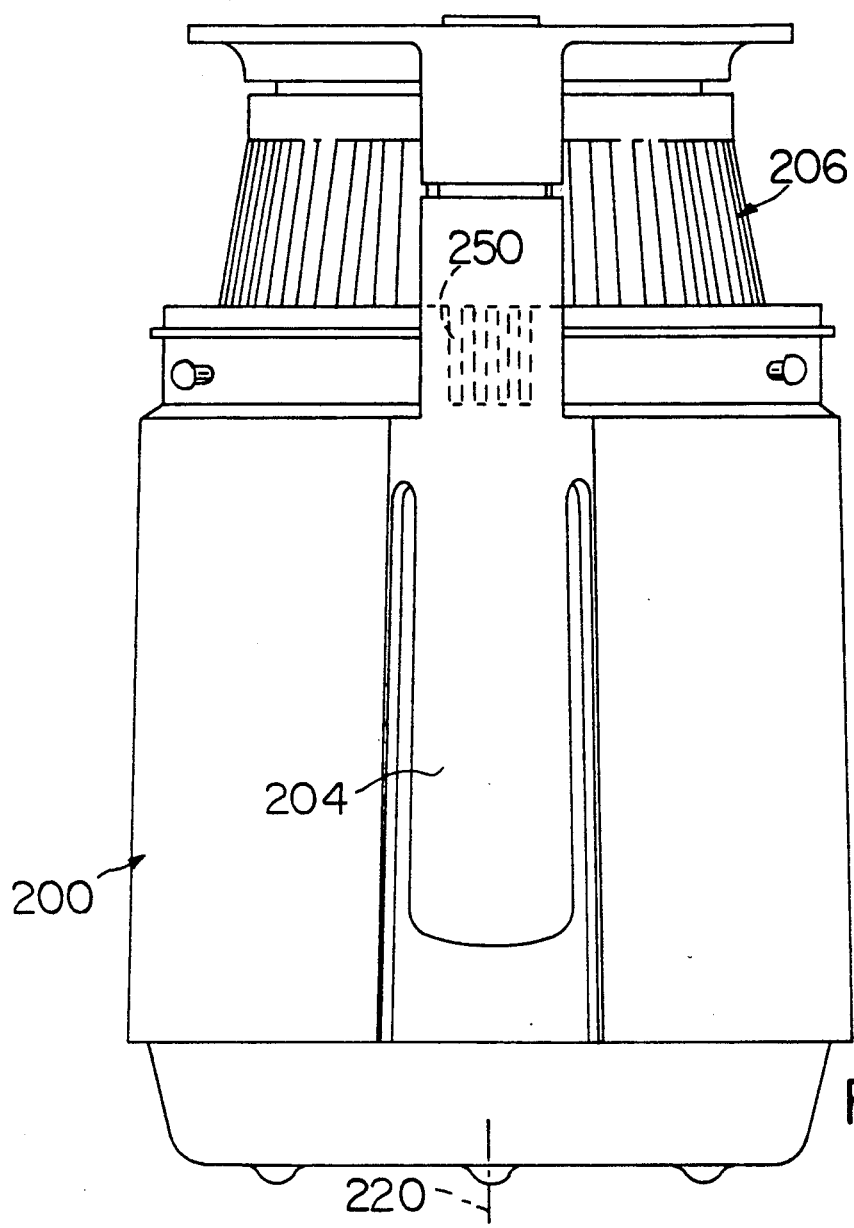
FIG. 13 is view of the apparatus shown in FIG. 11, taken on line 13—13 thereof.
Figure 14:
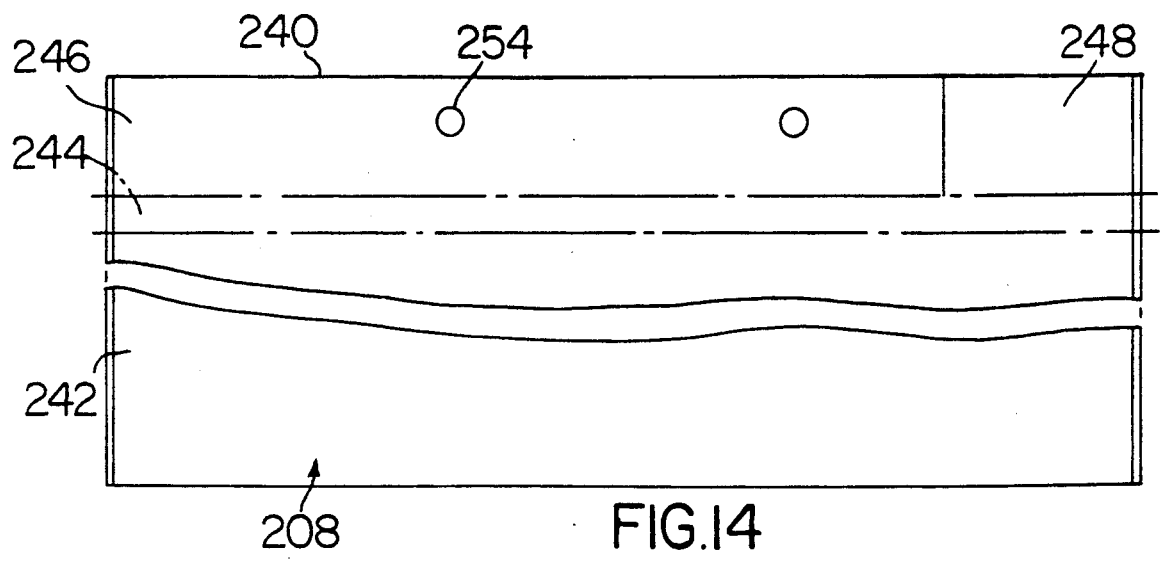
FIG. 14 is a partial view of a portion of the apparatus shown in FIG. 11.
Figure 16:
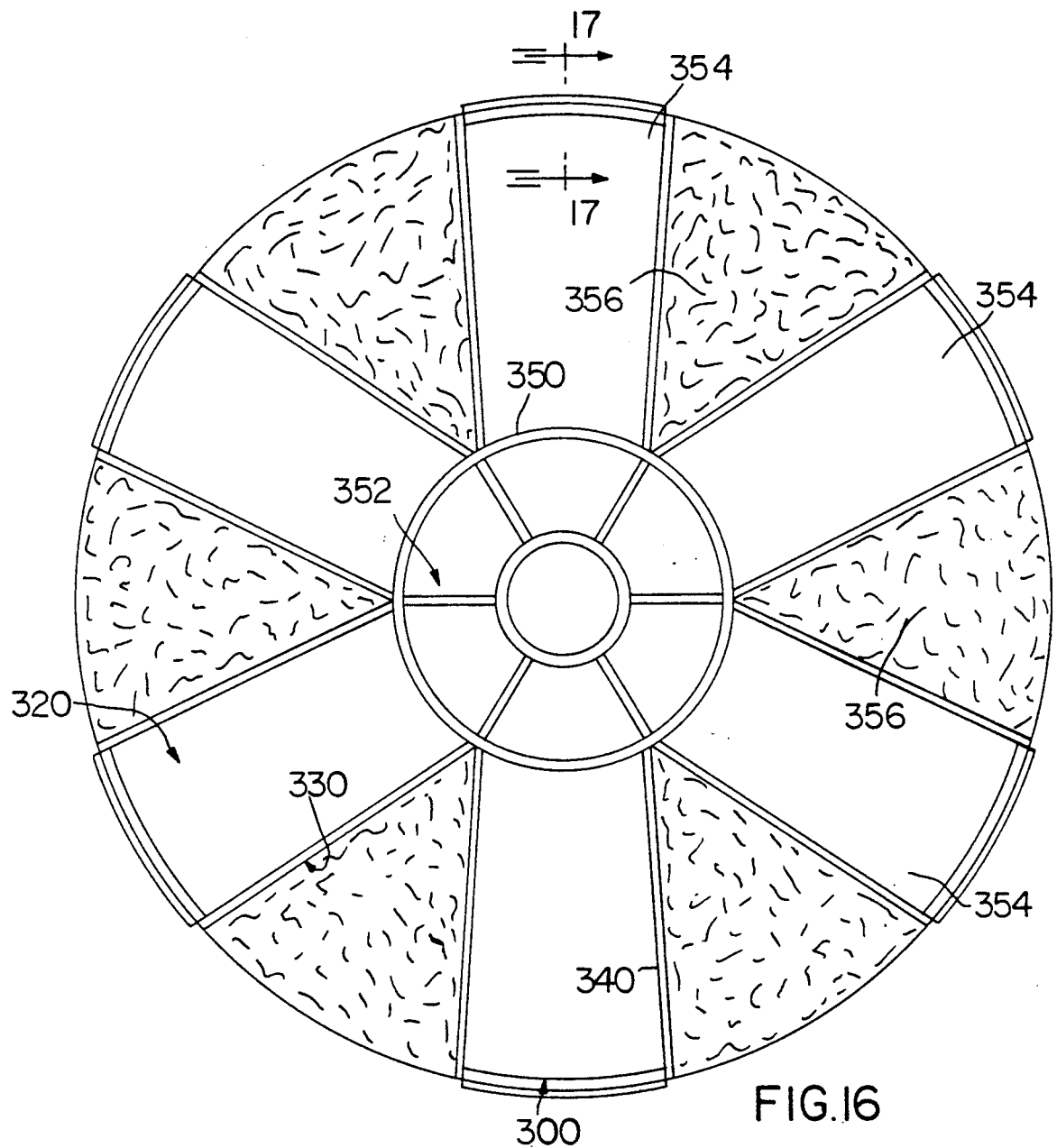
FIG. 16 is a top view of the embodiment of this invention shown in FIG. 10 as in a flat, pre-folded condition.
Figure 17:
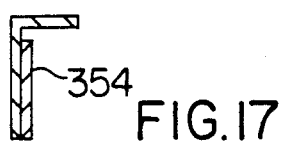
FIG. 17 is a sectional detail taken on line 17—17 of FIG. 16.

In a further alternative embodiment of this invention, a brew basket module 300 is provided (FIG. 16) that can be folded into a brew basket. An example of how module 300 can be folded into a brew basket is illustrated in FIG. 10 as brew basket 310.

The module 300 comprises a flat circular piece of filter paper 320 and strut members 330 fixed to the paper 320. The strut members 330 are preferably made of relatively rigid plastic, and are secured to the paper 320 preferably by bonding.

The strut members 330 are arranged in a plurality of radially extending sections 340 extending from a central circular pattern of struts 350. The resulting pattern consists of a central portion 352, and a first array of radially extending sectors 354 separated from a second array of radially extending sectors 356.

When the module 300 is folded into basket 310, the central portion 352 becomes the bottom 362 of basket 310. The first array of sectors 354 become right circular frusto-conical sides 364 of basket 310, and the second array of sectors 356 become folds 366 of basket 310. The struts 330 provide structural rigidity and integrity to the basket 310.

In an alternative manner of folding module 310, the second array of sectors 356 can be folded into folds extending interiorly of rim 370, of basket 310, instead of extending outwardly of rim 370, as shown in FIG. 10.

I claim:

1. In a brewing apparatus, the improvements comprising:

a brew holder including a rim portion and a cup portion having an inner surface extending downwardly from said rim portion;

a liner adapted to form a liquid impervious container, said liner being made of a flexible medium operable to be converter from a relatively flat condition in which said container has an internal volume of negligible proportions to an expand condition in which said container has an internal volume approximating that of said cup portion;

said liner being operable in said expanded condition to be supported by said rim portion of said holder and to depend from said rim portion within said cup portion, said liner having an outer surface operable to contact the inner surface of said cup portion in response to the placement of liquid into said supported liner.

2. A brewing apparatus according to claim 1 wherein said liner is made of a plastic film.

3. A brewing apparatus according to claim 2 wherein said plastic film is capable of withstanding a temperature of at least 212 degrees Fahrenheit.

4. A brewing apparatus according to claim 1 wherein said liner in said flat condition has a lower depending portion, a median lip portion and an upper overlay portion, said liner in said expanded condition being adapted to be supported by said holder with said lowr depending portion within said cup portion, with said median lip portion engaging said rim portion, and with said upper overlay portion positioned outwardly from the interior of said cup portion.

5. A brewing apparatus according to claim 1 wherein said liner in said flat condition has a lower depending portion, a median lip portion and an upper overlay portion, said liner in said expanded condition being adapted to be supported by said holder with the exterior surface of said overlay portion exterior of said holder and remote from contact with liquid contained in said supported liner.

6. A brewing apparatus according to claim 5 wherein said holder has an array of projections externally of said cup portion, said overlay portion of said liner is provided with an array of aperatures corresponding to said array of projections, said liner in said expanded condition being adapted to be supported by said holder with said array of aperatures engaged by said array of projections.

7. A brewing apparaus according to claim 6 wherein the engagement of said arrays of aperatures and projections is such as to produce a smooth fit between the said rim portion of said holder and said lip portion of said liner.

8. A brewing apparatus according to claim 5 wherein a cutout portion is provided in the upper overlay portion of said liner.

9. A brewing apparatus according to claim 1 further comprising means for positioning said liner with respect to said holder so as to prevent said liner in said expanded condition from being displaced from support by said rim portion of said holder in response to the introduction of liquid into said expanded condition liner.

10. A brewing apparatus according to claim 9 wherein said means for positioning said liner includes a brew basket.

11. A brew apparatus according to claim 11 further comprising a brew basket having a peripheral portion adapted to engage said rim portion of said holder in overlying relation with said liner supported by said rim portion.

12. A brewing apparatus according to claim 11 wherein said liner includes an upper overlay portion adapted to be positioned outwardly of the interior of said cup portion and outwardly of said peripheral portion of said brew basket.

13. A brewing apparatus according to claim 11 wherein said brew basket is isolated by said liner from direct contact with said rim and cup portions of said holder.

14. A brewing apparatus according to claim 11 wherein said holder includes an arm engageable with said brew basket for urging said peripheral portion thereof into compressive engagement with said rim portion and said liner supported thereby.

15. A brewing apparatus according to claim 14 wherein said holder is provided with a handle member radially exterior of said cup portion, said handle member having a top portion, a cylindrical recess formed in said top portion, and said arm includes a shank portion rotatably and telescopingly engaging said cylindrical recess.

16. A brewing apparatus according to claim 15, wherein, said arm includes a distributor portion, said brew basket having a top engageable by said distributor portion.

17. A brewing apparatus according to claim 16 further comprising detent means provided between said shank portion and said cylindrical recess for retaining said distributor portion in compressive engagement with said brew basket top.

18. A brewing apparatus according to claim 11 wherein said brew basket comprises a fiber filter portion and a plastic material bonded to said filter portion 19. A brewing apparatus according to claim 11 wherein said brew basket has a substantially flat planar configuration prior to engagement with said rim portion of said holder, said brew basket in said planar configuration being manually modifiable to a three-dimensional shape having a top portion spaced from said peripheral portion.

20. A brewing apparatus according to claim 19 wherein the sides of said three-dimensional shape substantially conform to a frustro-conical section.

21. In a brewing apparatus, the improvements comprising:

a brew holder including a rim portion and a cup portion having an inner surface extending downwardly from said rim portion;

a liquid impervious liner adapted to be positioned within said cup portion of said brew holder and to form a disposable brew container, said liner having a portion adapted to overlay said rim portion of said brew holder and having an outer surface operable to contact the inner surface of said cup portion; and a brew basket positionable on said rim portion of said brew holder in engagement with said overlay portion of said liner whereby said liner is adapted to isolate said brew holder from contact by a brewed liquid flowing from said brew basket.

22. A brewing apparatus according to claim 21 wherein said brew basket includes a bottom portion, a top portion, and a frustroconically shaped side wall joining said bottom and top portions; said side wall having an interior surface, an exterior surface, and ribs; said ribs forming alternating ridges and valleys arranged such that each ridge on one of said surfaces is opposed by a valley on the other of said surfaces.

23. A brewing apparatus according to claim 22 wherein said ribs extend substantially normal to said top and bottom portions; and said bottom portion is formed by a wall having an inner surface, an outer surface and raised and lowered portions arranged in a symetrical pattern within the perimetr of said bottom portion, said bottom wall being provided with at least one aperture for the passage of brew therethrough.

24. A brewing apparatus according to claim 23, wherein said brew basket further includes an integral outer wall extending from said top portion in diverging relation with said exterior surface of said side wall to a peripheral portion adapted to engage said rim portion of said holder in overlying relation with said overlay portion of said liner, said outer wall being provided with ribs corresponding to the said ribs on said side wall.

25. In a brewing apparatus, a brew basket having a bottom portion, a top portion, a frustroconically shaped side wall joining said bottom and top portions, said side wall having an interior surface and an exterior surface, and ribs on said side wall, said ribs extending substantially normal to said bottom and top portions and forming alternating ridges and valleys on said interior and exterior surfaces, each ridge on one of said surfaces being opposed by a valley on the other of said surfaces.

26. A brewing apparatus according to claim wherein said bottom portion is formed by a wall having an inner surface, an outer surface and raised and lowered portions arranged in a symmetrical pattern within the perimeter of said bottom portion, said bottom wall being provided with at least one aperture for the passage of brew therethrough.

27. A brewing apparatus according to claim 26 wherein said brew basket further includes an integral frustroconically shaped outer wall extending from said top portion toward said bottom portion in diverging relation with said exterior surface of said side wall, said outer wall terminating in a peripheral portion and being provided with ribs disposed substantially normal to said peripheral portion and corresponding to the said ribs on said side wall.

28. A brewing apparatus according to claim 27 further comprising a brew holder including a rim portion and a cup portion, said rim portion being engageable by the said peripheral portion of said brew basket.

* * * * *

UNITED STATES PATENT AND TRADEMARK OFFICE
CERTIFICATE OF CORRECTION

PATENT NO. : 5,036,755

DATED : August 6, 1991

INVENTOR(S) : Joseph D. Abdenour

It is certified that error appears in the above-identified patent and that said Letters Patent is hereby corrected as shown below:

Column 1, line 19, correct spelling of "comminuted"
Column 2, line 12, "unfusion" should read --infusion--
Column 2, line 50, "sectiononal" should read --sectional--
Column 3, line 48, "outardly" should read --outwardly--
Column 4, line 27, "egagement" should read --engagement--
Column 6, line 51, "outer" (2nd) should read --inner--
Column 6, line 58, "outer" (1st) should read --inner--
Column 7, line 26, "aperatures" should read --apertures--
Column 7, line 61, "compromises" should read --comprises--
Column 9, line 6, "converter" should read --converted--
Column 9, line 8, "expand" should read --expanded--
Column 9, line 27, "lowr" should read --lower--
Column 9, line 49, "apparaus" should read --apparatus--
Column 10, line 25, delete "," after --wherein--
Column 10, line 35, insert "." after --portion--
Column 11, line 8, "perimetr" should read --perimeter--

UNITED STATES PATENT AND TRADEMARK OFFICE
CERTIFICATE OF CORRECTION

PATENT NO. : 5,036,755

DATED : August 6, 1991

INVENTOR(S) : Joseph D. Abdénour

It is certified that error appears in the above-identified patent and that said Letters Patent is hereby corrected as shown below:

Column 12, line 4, insert "25" after --claim--.

Signed and Sealed this

Tenth Day of November, 1992

*Attest:*

DOUGLAS B. COMER

*Attesting Officer*      *Acting Commissioner of Patents and Trademarks*